Sept. 7, 1926.
W. M. PIKE
1,599,345
TRANSMISSION MECHANISM
Filed Nov. 26, 1923    4 Sheets-Sheet 1
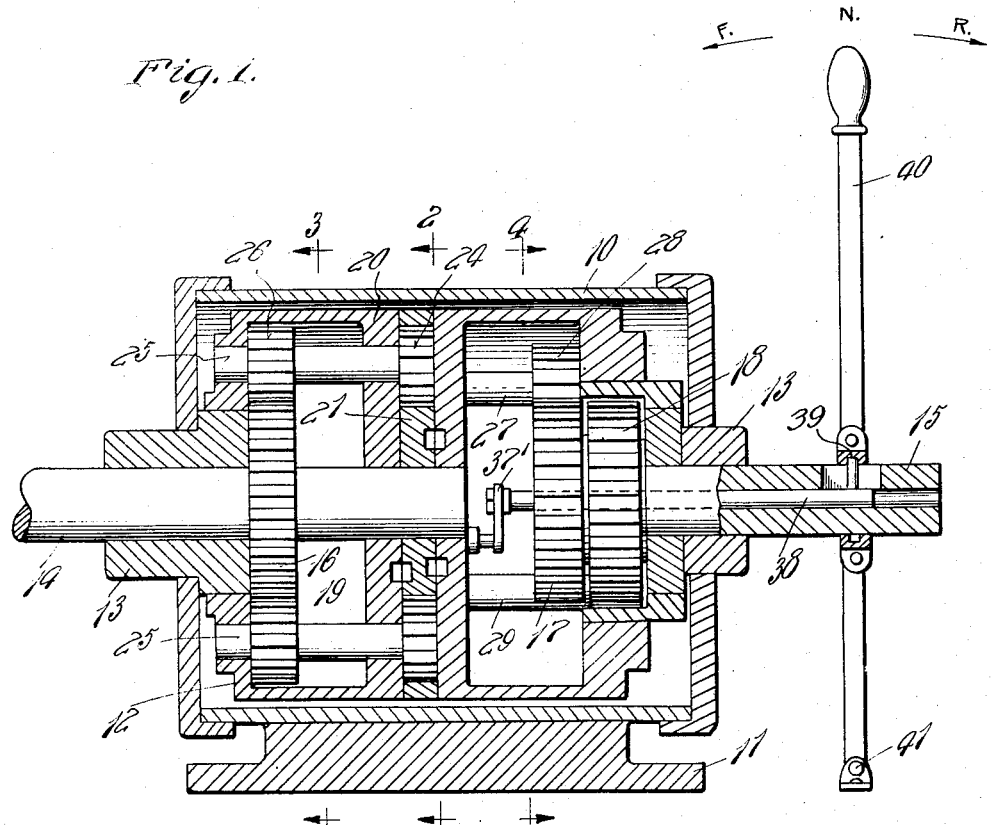
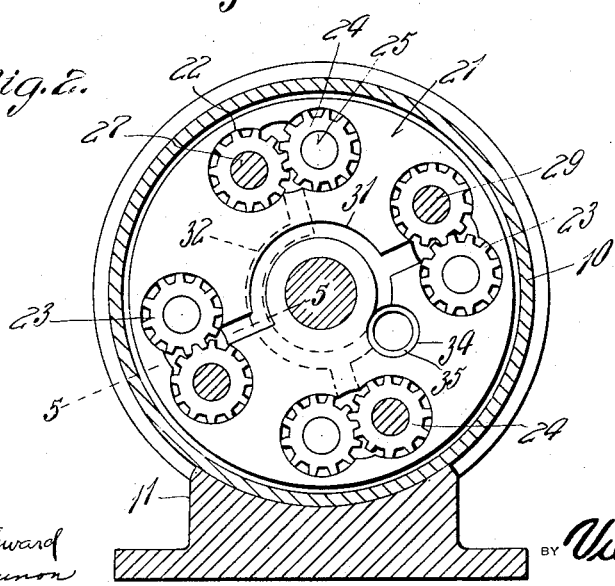
W.M.Pike
INVENTOR
BY Victor J. Evans
ATTORNEY
WITNESS:

Sept. 7, 1926.
W. M. PIKE
1,599,345
TRANSMISSION MECHANISM
Filed Nov. 26, 1923 4 Sheets-Sheet 3
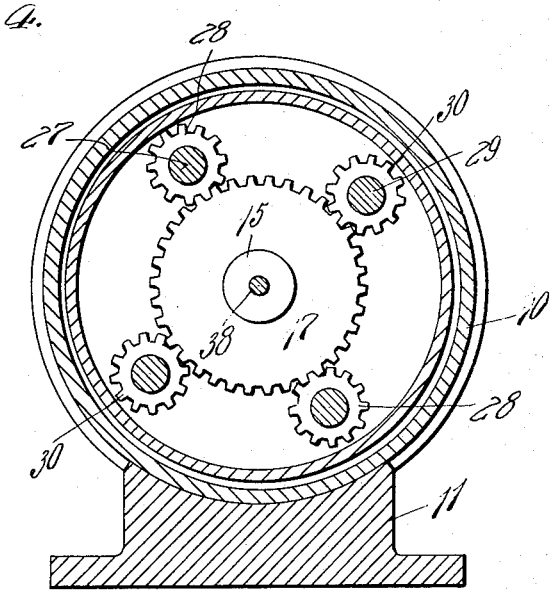
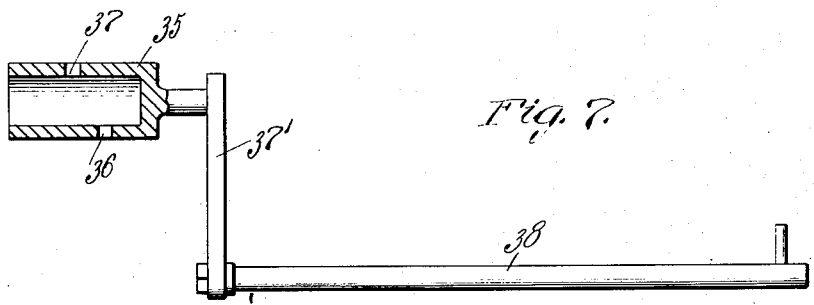
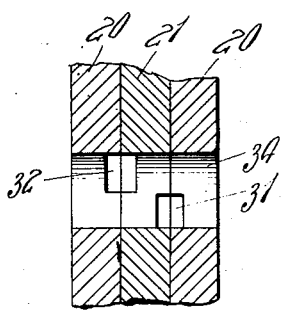

Sept. 7, 1926.

W. M. PIKE 1,599,345

TRANSMISSION MECHANISM

Filed Nov. 26, 1923  4 Sheets-Sheet 4

W. M. Pike
INVENTOR

BY Victor J. Evans
ATTORNEY

Patented Sept. 7, 1926.

UNITED STATES PATENT OFFICE.

WILLIAM M. PIKE, OF PARNASSUS, PENNSYLVANIA.

TRANSMISSION MECHANISM.

Application filed November 26, 1923. Serial No. 677,076.

This invention relates to variable speed mechanisms and has for an object the provision of a power transmission mechanism, by means of which a drive and a driven shaft may be connected and the relative speed and direction of rotation of the latter regulated in a manner to permit of speed changes without the usual objectionable shifting of gears, the invention being especially adapted for use in motor driven vehicles.

Another object of the invention is the provision of a speed change mechanism by means of which the operation of a driven shaft from a drive shaft may be controlled, so that operation of the driven shaft may be stopped while the drive shaft is rotating, without the use of a clutch.

With the above and other objects in view, the invention further includes the following novel features and details of construction, to be hereinafter more fully described, illustrated in the accompanying drawings and pointed out in the appended claims.

In the drawings:—

Figure 1 is a longitudinal sectional view of a transmission mechanism constructed in accordance with the invention.

Figure 2 is a section on the line 2—2 of Figure 1.

Figure 3:
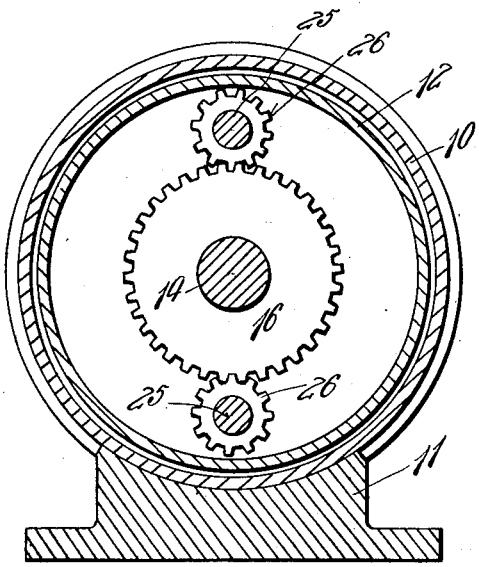

Figures 3 and 4 are sections taken respectively on the lines 3—3 and 4—4 of Figure 1.

Figure 5:
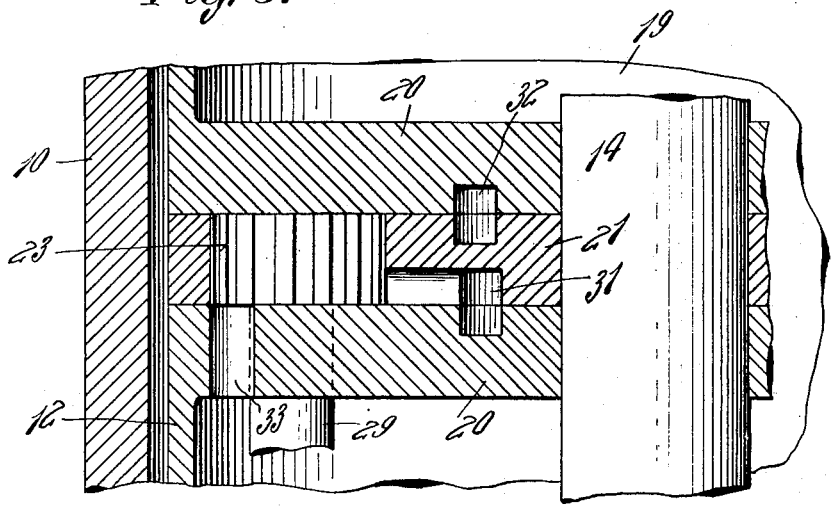

Figure 5 is an enlarged fragmentary section on the line 5—5 of Figure 2.

Figure 6 is a fragmentary section showing the valve seat.

Figure 7 is a detail sectional view of the valve.

Figure 8:
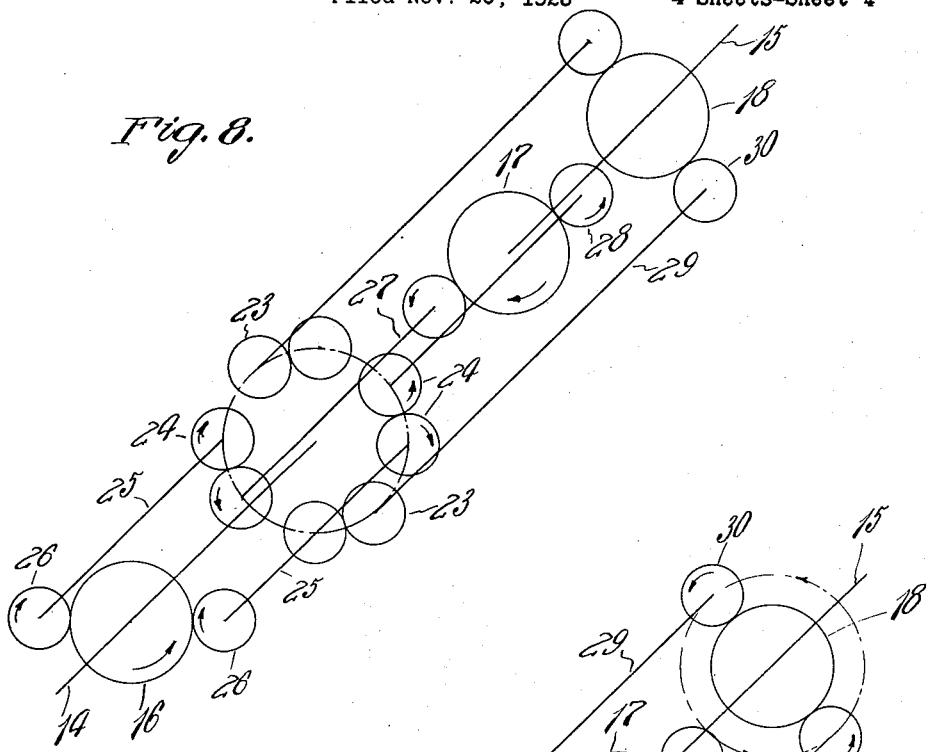
Figure 9:
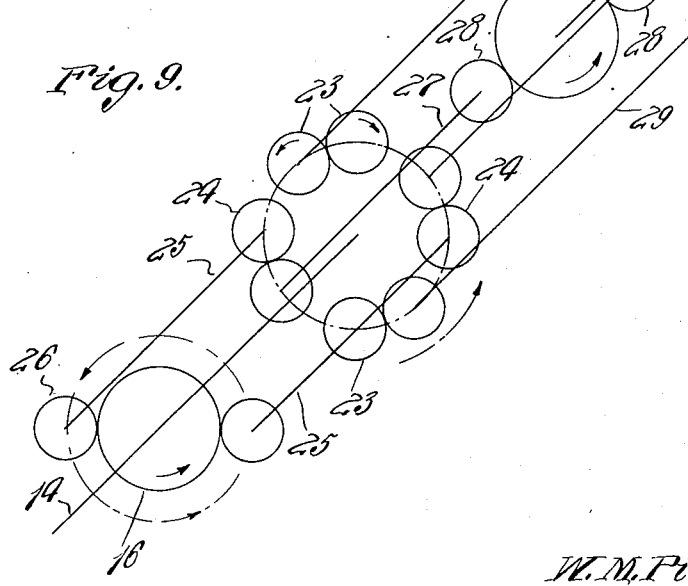

Figures 8 and 9 are diagrammatic views, the former illustrating the driven shaft as rotating in a direction reverse from the drive shafe while the latter indicates the drive and driven shaft operating in the same direction, the direction of operation being indicated by arrows.

Referring to the drawings in detail wherein like characters of reference denote corresponding parts, the reference character 10 indicates a housing which may be provided with a suitable base 11 and which is designed to contain the transmission mechanism constituting the present invention. The housing 10 is stationary, while mounted in this housing is a rotatable casing 12 which is supported upon bearing sleeves 13 secured to the housing 10. These sleeves serve to support the casing 12 and in addition provide bearings for a main drive shaft 14 and a driven shaft 15, the said shafts being axially aligned and extending within the casing 12.

Secured upon the drive shaft 14 is a gear 16, while mounted upon the driven shaft 15 are gears 17 and 18, the former being fast upon the shaft and the latter relatively stationary or rigid with the bearing sleeve 13.

These gears are mounted within the casing upon opposite sides of a partition and the latter divides the casing into separate fluid chambers 19. The partition includes spaced plates 20 between which there is mounted for rotation upon the shaft 14 a plate or disk 21.

The plate 21 is provided with a plurality of spaced openings 22 within which there is rotatably mounted pairs of intermeshing pinions 23 and 24. One of the pinions 24 of each pair is mounted upon a shaft 25, the said shaft being mounted in suitable bearings within the casing 12 and also having mounted thereon a pinion 26. This last mentioned pinion engages the gear 16, one being provided upon diametrically opposite sides of the said gear. The other pinion 24 is mounted upon a shaft 27 which also has secured thereon a pinion 28. The pinions 28 and the shafts 27 are duplicated upon diametrically opposite sides of and engage the gear 17.

One of the pinions 23 of each pair is carried by a shaft 29 so that a shaft 29 will be provided upon diametrically opposite sides of the casing. The shafts 29 have secured thereon pinions 30 and the latter engage the gear 18.

The openings 22 within which the pinions are located provide compression chambers, the chambers of the pinions 23 being connected by an arcuate passage 31 which is located in one face of the plate 21, while the chambers of the pinions 24 are connected by an arcuate passage 32 which is located in the opposite face of the plate 21. As the plates 20 abut the opposite faces of the plate 21, they provide one wall for the passages 31 and 32, an inlet port 33 which extends through one of the plates 20 serves to admit fluid from one of the fluid chambers 19 to the passage 31.

Both the passage 31 and the passage 32 communicate with a valve chamber 34 which extends through the plates 20 and 21. This valve chamber is of cylindrical formation and the ends of the passages 31 and 32 discharge into this chamber. Operating within the valve chamber 34 is a hollow cylindrical valve 35 which is open at one end and which is provided with spaced ports 36 and 37 which are adapted to be brought into and out of register with the discharge ends of the passages 31 and 32 respectively. The valve 35 has connected thereto an arm 37' while the latter is in turn connected to one end of a rod 38. This rod is operatively connected as shown at 39 to a lever 40. This lever is pivotally mounted as at 41 so that it may be rocked in opposite directions to move the ports 36 and 37 into and out of register with the discharge ends of the passages 31 and 32 as just explained.

The casing 12 is designed to be filled to approximately its center line with a light lubricating oil. With the lever 40 set at neutral or in the position indicated at N in Figure 1, the ports 36 and 37 will register with the discharge ends of the passages 31 and 32, so that if power is applied to the driven shaft 14 the fluid from the fluid chambers 19 will be permitted to enter the ports 33 and 34 and travel past the pinions 23 and 24 into and through the passages 31 and 32 and through the ports 36 and 37. The pinions 23 and 24 will thus be free to rotate and no operation of the shaft 15 will occur.

Should the lever 40 be moved toward the position indicated at F, the discharge end of the passages 31 and 32 would be closed proportionately to the movement of the lever, pressure of the fluid within the compression chambers or openings 22 would have a tendency to retard motion of the pinions, the retarding effect becoming more effective until the valve is entirely closed. The same action would occur with the lever 40 moved in an opposite direction or towards the position R which would be reverse.

Referring particularly to Figure 8 in which the parts are shown in diagram it will be seen that with the drive shaft 14 operating in the direction of the arrow indicated on the gear 16, the pinions 26 will rotate in a reverse direction. These pinions in turn drive one of the pinions 24 of each pair of pinions, which pinions 24 are mounted within the plate 21 which is freely rotatable. The pinions 24 drive the shafts 27 and the latter operate the gear 17 which is keyed or secured to the shaft 15. One of the gears 23 of each pair does not transmit power, being merely an idler driven by the other gear 23 of each pair, the idler serving merely to provide sufficient compression to be acted upon by the fluid to retard the operation of the shaft carried gears 23. This compression within the compression chambers 22 tends to retard operation of the pinions, the retarding effect being regulated by the position of the valve 35. Thus if the gear 16 is driven in the direction indicated by the arrow and the plate 21 was held against rotation due to the pressure of fluid within the chambers 22, the gear 17 would be rotated in an opposite direction as indicated by the arrow on said gear, with the pinions also rotating in the direction of their arrows. The speed of rotation of the gear 17 is regulated by the position of the valve as previously described.

Referring to Figure 9, when the lever 40 is moved to the position R and the valve 35 is closed, the pinions 24 will be held against rotation, being carried around from the direction of the arrows by the gear 16 so that the plate 21 is rotated in the same direction. The pinions 24 are also held against rotation and carry the gear 17 with them in the same direction. The gear 18 being stationary, it will be seen that if a retarding pressure is brought to bear upon the pinions 23 so as to stop their rotation, then the pinions 30 which are fixed to the shafts 29 and in mesh with the stationary gear 18, would stop rotation of the casing 12 and reverse the direction of rotation of the gear 17.

Should the lever 40 be placed in a neutral position, neither of the conditions existing in Figure 8 or 9 would occur, therefore the shaft 15 would be idle so that the necessity for a clutch is obviated.

The invention is susceptible of various changes in its form, proportions and minor details of construction and the right is herein reserved to make such changes as properly fall within the scope of the appended claims.

Having described the invention what is claimed is:—

1. A variable speed mechanism embodying a casing, a drive shaft and a driven shaft extending into the casing, means including a rotatable member dividing the casing into separate fluid chambers, said member having passages therethrough to provide communication between the fluid chambers, intermeshing pinions in said passages, means operatively connecting the pinions with the drive and driven shafts, a valve for controlling the passage of fluid through said passages to control the speed of rotation of the driven shaft and relatively stationary means operatively associated with the pinions to control the direction of rotation of said driven shaft.

2. A variable speed mechanism embodying a casing, a drive shaft and a driven shaft extending into the casing, means including a rotatable member dividing the casing into separate fluid chambers, said member having passages therethrough to provide communication between the fluid chambers, intermeshing pinions in said passages, means operatively connecting the pinions with the drive and driven shafts, a valve for controlling the passage of fluid through said passages to control the speed of rotation of the driven shaft and relatively stationary means operatively associated with the pinions to control the direction of rotation of said driven shaft.

3. A variable speed mechanism embodying a casing, a drive shaft and a driven shaft extending into the casing, means including a rotatable member dividing the casing into separate chambers, said member having passages therethrough to provide communication between the fluid chambers, compression chambers in said passages, compression elements in said compression chambers, means operatively connecting the compression elements and the drive and driven shafts, and a valve for controlling the passage of fluid through said passages to the compression elements and regulate the compression within the compression chambers to control the operation of the drive shaft.

4. A variable speed mechanism embodying a casing, a drive shaft and a driven shaft extending into the casing, means including a rotatable member dividing the casing into separate fluid chambers, said member having passages therethrough to provide communication between the fluid chambers, compression elements located within the path of the fluid within the passages, means operatively connecting the compression elements and the drive and driven shafts and means for controlling the passage of fluids through said passages to regulate the operation of the compression elements and control the operation of the driven shaft.

5. A variable speed mechanism embodying a casing, a drive shaft and a driven shaft extending into the casing, spaced plates dividing the casing into separate fluid chambers and defining an intermediate chamber, a member rotatable within the intermediate chamber, compression chambers within the rotatable member, compression elements within the compression chambers, means operatively connecting the compression elements and the drive and driven shafts, inlet ports for the compression chambers, outlet passages for said compression chambers and a valve operable to control the outlet passages to regulate the flow of fluid through and speed of operation of the compression elements.

6. A variable speed mechanism embodying a casing, a drive shaft and a driven shaft extending into the casing, spaced plates dividing the casing into separate fluid chambers and defining an intermediate chamber, a member rotatable within the intermediate chamber, compression chambers within the rotatable member, compression elements within the compression chambers, means operatively connecting the compression elements and the driven and drive shafts, ports establishing communication between the fluid chambers and compression chambers, a valve to control the ports and regulate the flow of fluid to the compression chambers and relatively stationary means operatively associated with the compression elements to control the direction of rotation of the driven shaft.

7. A variable speed mechanism embodying a casing, a drive shaft and a driven shaft extending into the casing, a gear fast upon the drive shaft, a forward gear upon the driven shaft, a reverse gear upon the driven shaft, means including a rotatable member dividing the casing into separate fluid chambers, said member having fluid passages therethrough to provide communication between the fluid chambers, intermeshing pinions within said passages in the path of the fluid, means operatively connecting certain of the pinions with the forward gear of the driven shaft, means operatively connecting other of the pinions with the reverse gear of the driven shaft, means operatively connecting certain of the pinions with the gear of the drive shaft, means for controlling the passage of fluid through the passages to provide compression to act upon and regulate the operation of the pinions and means included in the fluid controlling means to select the pinions to be acted upon and regulate the direction of rotation of the driven shaft.

In testimony whereof I affix my signature.

WILLIAM M. PIKE.